US012619909B2

(12) United States Patent (10) Patent No.: US 12,619,909 B2
Song et al. (45) Date of Patent: May 5, 2026

(54) METHOD FOR COMPREHENSIVE PERFORMANCE EVALUATION OF STUDENTS BASED ON DEEP LEARNING NETWORK

(71) Applicants: CHONGQING UNIVERSITY, Chongqing (CN); STAR INSTITUTE OF INTELLIGENT SYSTEMS, Chongqing (CN); DB (CHONGQING) INTELLIGENT TECHNOLOGY RESEARCH INSTITUTE CO., LTD, Chongqing (CN); UNIVERSITY OF ELECTRONIC SCIENCE AND TECHNOLOGY OF CHINA, Chengdu City (CN)

(72) Inventors: Yongduan Song, Chongqing (CN); Feng Yang, Chengdu City (CN); Rui Li, Chongqing (CN); Hongyu Xia, Chongqing (CN); Qin Chen, Chongqing (CN); Shichun Wang, Chongqing (CN); Liangjie Li, Chongqing (CN); Haoyuan Zhong, Chongqing (CN)

(73) Assignees: Chongqing University, Chongqing (CN); Star Institute of Intelligent Systems, Chongqing (CN); DB (Chongqing) Intelligent Technology Research Institute Co., Ltd, Chongqing (CN); University of Electronic Science and Technology of China, Chengdu City (CN)

( * ) Notice: Subject to any disclaimer, the term of this patent is extended or adjusted under 35 U.S.C. 154(b) by 1107 days.

(21) Appl. No.: 17/681,555

(22) Filed: Feb. 25, 2022

(65) Prior Publication Data

US 2023/0070427 A1 Mar. 9, 2023

(30) Foreign Application Priority Data

Sep. 9, 2021 (CN) .......................... 202111054782.3

(51) Int. Cl.
*G06N 20/00* (2019.01)
*G09B 19/00* (2006.01)

(52) U.S. Cl.
CPC ............. *G06N 20/00* (2019.01); *G09B 19/00* (2013.01)

(58) Field of Classification Search
CPC ................................ G06N 20/00; G09B 19/00
See application file for complete search history.

(56) References Cited

PUBLICATIONS

Sekeroglu et al. Student Performance Prediction and Classification Using Machine Learning Algorithms. ICEIT 2019, Mar. 2-4, 2019, Cambridge, United Kingdom (Year: 2019).*

(Continued)

*Primary Examiner* — Michelle T Bechtold
*Assistant Examiner* — Robert H Bejcek, II
(74) *Attorney, Agent, or Firm* — HUNTON ANDREWS KURTH LLP

(57) ABSTRACT

The present disclosure provides a student performance evaluation method and system based on artificial intelligence (AI) identification data, and relates to the field of intelligent education. A lightweight network model suitable for student performance evaluation takes the AI identification data as an input and evaluation results as an output. A training data generation algorithm is provided, and multidimensional AI identification data and labels are uniformly processed into training data suitable for the network model through the above algorithm, which can solve the problems that dimensions between any AI identification data and various labels are not uniform, and original data cannot meet training of a multidimensional and cross-time prediction model. A simulated data generation algorithm and a simu- (Continued)

lated label generation algorithm are provided, and simulated training data is generated using these algorithms in conjunction with the training data generation algorithm.

5 Claims, 3 Drawing Sheets

(56) References Cited

PUBLICATIONS

Nonnemaker et al. Using Synthetic Data Safely in Classification. Lehigh University. 2017. (Year: 2017).*

Chernyshova et al. Generation method of synthetic training data for mobile OCR system. Proc. of SPIE vol. 10696, 106962G • © 2018 SPIE (Year: 2018).*

Gutierrez et al. Synthetic training data generation for deep learning based quality inspection. Apr. 7, 2021. (Year: 2021).*

Ahn Le et al. Using Synthetic Data to Train Neural Networks is Model-Based Reasoning. 2017. (Year: 2017).*

Jaderberg et al. Synthetic Data and Artificial Neural Networks for Natural Scene Text Recognition. 2014. (Year: 2014).*

\* cited by examiner

METHOD FOR COMPREHENSIVE PERFORMANCE EVALUATION OF STUDENTS BASED ON DEEP LEARNING NETWORK

CROSS REFERENCE TO RELATED APPLICATION

This patent application claims the benefit and priority of Chinese Patent Application No. 202111054782.3, filed on Sep. 9, 2021, the disclosure of which is incorporated by reference herein in its entirety as part of the present application.

TECHNICAL FIELD

The present disclosure relates to the field of intelligent education, and in particular to a student performance evaluation method and system based on artificial intelligence (AI) identification data.

BACKGROUND ART

With vigorous development and maturity of the artificial intelligence technology, it has been widely used in various scenarios. In classroom scenarios, the artificial intelligence technology is often used to identify emotions, gestures, and sight lines of students. At the current stage, the artificial intelligence technology in the classroom environment is usually single-technical identification, that is, each plays its own identification function, and is also single time-space identification, that is, only a single student at the current stage is identified. Such single-technical and single time-space identification cannot fully utilize the benefits brought by such technology to the field of intelligent education, and there are problems such as waste of resources and redundancy of software and hardware resources.

In order to give full play to the role of various single-dimensional identification technologies to reduce resource waste and redundancy, the present disclosure provides a unified and generalized method to perform multidimensional processing on AI identification data obtained by the single-technical and single time-space dimensions, and then perform comprehensive evaluation and development prediction of the students in multi time-space dimensions.

SUMMARY

The present disclosure aims to solve the problem in the prior art, and particularly provides a student performance evaluation method and system based on AI identification data.

To achieve the above objective of the present disclosure, according to a first aspect of the present disclosure, the present disclosure provides a student performance evaluation method based on AI identification data, including:

step S1, designing a deep learning network model, where the deep learning network model is capable of performing comprehensive performance evaluation of students in any time span by using processed AI identification data;

step S2, generating simulated AI identification data containing multiple students using a simulated data generation algorithm, where the simulated AI identification data generated in this step meets multidimensional randomness and multiple dimensions meet normal distribution, and a trend of an overall data value is controllable;

step S3, generating simulated labels by any amount of simulated AI identification data generated in step S2 using a simulated label generation algorithm, where the simulated labels are used to generate simulated training data, and the simulated training data is used for pre-training of the deep learning network model;

step S4, processing the simulated AI identification data through a training data generation algorithm using the simulated labels in step S3 in conjunction with all the simulated AI identification data corresponding to the labels to generate the simulated training data, where the simulated training data is stored in a database;

step S5, pre-training the deep learning network model designed in step S1 using the simulated training data generated in step S4;

step S6, determining real labels of the students, where the real labels represent performance evaluation of the students, and the real labels are stored in the database, and are capable of being modified;

step S7, obtaining all real labels in the database, and then obtaining all real AI identification data corresponding to each real label in the database; and processing the obtained real AI identification data through the training data generation algorithm to generate final real training data, where the real training data may be stored in the database;

step S8, obtaining the real training data of the database, and training the deep learning network model in step S1 using the obtained real training data, where different real training data is used for the deep learning network model at different stages;

when prediction accuracy of the deep learning network model is less than or equal to 70%, the training data generated by the training data generation algorithm is used; and when the prediction accuracy of the deep learning network model is more than 70%, training data generated by a training data generation algorithm with a discard policy is used; and step S9, after the training of the deep learning network model is mature, performing comprehensive performance evaluation of the students in any time and space span using the trained deep learning network model.

Further, the simulated data generation algorithm in step S2 may include the following specific steps:

step S21, randomly generating information of n students, marking the student information with different student IDs, where the student IDs may be recorded as:

$$[sid_1, sid_2, \ldots, sid_i, \ldots, sid_n]; \text{ and}$$

$sid_i$ may be a student ID of an i-th student generated by simulation, the student information may further include gender, college, and name, these basic student information may be permanently stored in the database, and these generated students may simulate a process of selecting courses, attending classes and generating the AI identification data;

step S22, using the student IDs and a random generation algorithm in step S21 to give each student a unique property, where a set of unique properties of the n students may be recorded as $[property_1, property_2, \ldots, property_i, \ldots, property_n]$, and $property_i$ may be a unique property of the i-th student generated by simulation; the unique property of each student may represent uniqueness of the simulated student, indicating that the student is more inclined to show a good learning state or a bad learning state; and the unique property of each student may be approximately random, all unique properties may obey normal distribution as a whole, and the set of unique properties obtained at the current stage may not have complete randomness and may not obey normal distribution for the time being;

step S23, scrambling the set of unique properties in step S22 using a random scrambling algorithm to obtain a scrambled set of unique properties [Lproperty₁, Lproperty₂, . . . , Lpropertyᵢ, . . . , Lpropertyₙ], where the scrambled unique properties may be almost completely random;

step S24, mapping values in the scrambled set of unique properties by a function, such that the scrambled set of unique properties after mapping has a normal distribution characteristic, where each Lpropertyᵢ in the scrambled set of unique properties may be mapped by the function:

$$f(Lproperty_i) = \begin{cases} 0.5 - 0.5\dfrac{G(Lproperty_i - 0.5)}{G(0.5) - G(0)}, & Lproperty_i \le 0.5 \\ 0.5 + 0.5\dfrac{G(Lproperty_i - 0.5)}{G(0.5) - G(0)}, & Lproperty_i > 0.5 \end{cases}, \text{ and}$$

$$G(x) = \frac{1}{2}e^{\frac{-\pi(Lproperty_i - 0.5)^2}{4}},$$

and the scrambled set of unique properties after mapping may be recorded as a final set of unique properties:

[finalProperty₁,finalProperty₂, . . . , finalPropertyᵢ, . . . ,finalPropertyₙ];

step S25, defining Le courses, where each course may have choiceᵢ choices, Le≥i≥0, and each course may have teacher, class time, and course week information; and each student generated in step S21 may randomly select courses based on these courses; and step S26, sequentially generating the simulated AI identification data from the first course of the first week according to a time sequence.

Further, the simulated label generation algorithm in step S3 may include the following specific steps:

step S31, randomly selecting a course, randomly selecting a student of the course, and randomly generating a time period, where this time period may be within a time period corresponding to the selected course;

step S32, according to limitation of the course, the student, and the time period in step S31, obtaining a set of simulated AI identification data matching the course, the student, and the time period:

$$T=\{[a_{11},a_{12}, . . . ,a_{1i}, . . . ,a_{1n}],[a_{21},a_{22}, . . . , a_{2i}, . . . ,a_{2n}], . . . ,[a_{m1},a_{m2}, . . . ,a_{mi}, . . . ,a_{mn}]\},$$

where $a_{mi}$ represents i-th simulated AI identification data in a randomly generated m-th time period under the premise of the limitation of the course and the student;

step S33, allocating a positive state weight and a negative state weight to each dimension feature, where each dimension feature may define a weight allocation function $g_i(x)$, and each weight allocation function may further have a weight $W_i$;

step S34, calculating label values using the set T of simulated AI identification data in step S32:

$$label = \frac{\sum_{i=1}^{m}\sum_{j=1}^{n}T[i][j]g_j(x)W_j}{m \times \left(\sum_{i=1}^{n}W_i\right)} \times 100;$$

and step S35, repeating steps S31, S32, and S34 to generate the simulated labels until the number of simulated labels reaches an expected value.

Further, the training data generation algorithm in steps S4, S7, and S8 may include the following specific steps:

step S41, obtaining all the AI identification data corresponding to the labels in step S4:

Data=[a₁₁,a₁₂, . . . ,a₁ᵢ . . . ,a₁ₙ],[a₂₁,a₂₂, . . . , a₂ᵢ, . . . ,a₂ₙ], . . . ,[aₘ₁,aₘ₂, . . . ,aₘᵢ, . . . , aₘₙ]};

step S42, since a standard training data length is determined to be S, executing step S43 when m in Data is less than S, executing step S44 when m in Data is greater than S, and if S is equal to m, directly matching the data Data with the label as one of the final training data;

step S43, calculating A=S/m, rounding down A to obtain A1, and taking the remainder of S to m to obtain B; and copying A1-1 copies of random B elements in Data, copying A1+1 copies of remaining m-B elements, and matching the copied Data with the label as one of the final training data; and step S44, calculating C=m/S, rounding down C to obtain B1, and taking the remainder of m to S to obtain D, and summing and averaging the first D connected elements with a length of B1-1 in Data to synthesize an element, summing and averaging m-B connected elements with a length of B in the remaining elements to synthesize an element, and matching Data after synthesis with the label as one of the final training data.

Further, in step S22, a process of using the random generation algorithm to give each student the unique property may include the following specific steps:

step S221, customizing a prime number K greater than n, and dividing each student ID in a student ID set in step S21 by K to obtain a set of temper numbers:

[sid₁/K,sid₂/K, . . . ,sidᵢ/K, . . . sidₙ/K]=[temperNumber₁,temperNumber₂, . . . , temperNumberᵢ, . . . ,temperNumberₙ], where temperNumberᵢ may be a temper number of the i-th student generated by simulation;

step S222, customizing a truncation start bit K and a truncation stop bit J, where J>K; and intercepting K-th to J-th bits after a decimal point of each temper number in the set of temper numbers in step S221 to obtain a set of truncation numbers [truncation₁, truncation₂, . . . , truncationᵢ, . . . , truncationₙ]; and step S223, dividing each number in the set of truncation numbers in step S222 by $10^{J+1-k}$ to obtain the unique property:

[truncation₁/10^{J+1-K},truncation₂/10^{J+1-K}, . . . ,truncationᵢ/10^{J+1-K}, . . . ,truncationₙ/10^{J+1-K}]=[property₁,property₂, . . . ,propertyᵢ, . . . ,propertyₙ].

Further, in step S23, a process of scrambling the set of unique properties in step S22 using the random scrambling algorithm may include the following steps:

step S231, customizing a number of scrambling Y, a random seed X1, a random seed X2, a modulus M1, a modulus M2, a multiplication amount A1, a multiplication amount A2, and a loop mark I=1;

step S232, rounding down n×(X1/M1) to obtain $P_I$, and rounding down n×(X2/M2) to obtain $Q_1$, where X1=(A1×X1+C1), and X2=(A2×X2+C2); and taking the remainder of X1 using M1 and assigning a remainder result to X1, and taking the remainder of X2 using M2 and assigning a remainder result to X2, where I=I+1;

step S233, when I is less than Y, executing S232 until I is greater than or equal to Y to finally obtain a set of scrambling instructions [$P_1$, $Q_1$, $P_2$, . . . , $P_i$, $Q_i$, . . . , $P_Y$, $Q_Y$]; and step S234, taking out $P_i$, $Q_i$, 1<<i≤Y from the beginning to the end in pairs each time from the set of scrambling instructions in step S233, and then exchanging two properties with subscripts of $P_i$, $Q_i$ in the set of unique properties in step S22 to obtain [Lproperty$_1$, Lproperty$_2$, . . . , Lproperty$_i$, . . . , Lproperty$_n$] after all exchanges are completed.

Further, step S26 may include the following specific steps:

step S261, randomly generating a number B obeying (0,1) normal distribution;

step S262, obtaining the unique property of the student finalProperty$_i$ corresponding to the simulated AI identification data being generated; and if B+finalProperty$_i$, executing step S263 between an interval [0,1], otherwise executing step S261; and step S263, customizing an overall positive state rate of the currently generated simulated AI identification data as V, outputting a positive state if B+finalProperty$_i$ is greater than a in the following equation, and outputting a negative state if B+finalProperty$_i$ is less than or equal to a in the following equation, where the equation in step S263 may be $$\frac{\int_0^1 \int_0^a \frac{1}{\sqrt{2\pi}} e^{-\frac{(x-y)^2}{2}} dxdy}{\int_0^1 \int_0^1 \frac{1}{\sqrt{2\pi}} e^{-\frac{(x-y)^2}{2}} dxdy} = V,$$

and since a value on a left side of the above equation increases with a, only B+finalProperty$_i$ may be replaced with a in the equation during specific determination, and whether the value on the left side of the equation is greater than or less than V may be determined after replacement, the positive state may be output if the value on the left side of the equation is greater than V, and the negative state may be output if the value on the left side of the equation is less than V.

A student performance evaluation system based on AI identification data includes a comprehensive evaluation module, an early warning module, and a potential exploration module.

Based on the student performance evaluation method based on AI identification data according to the above content, the comprehensive evaluation module performs multi time-space performance evaluation of each subject of each student, performs overall performance evaluation of each student, and performs overall performance evaluation of all students.

Based on the student performance evaluation method based on AI identification data according to the above content, the early warning module performs negative performance evaluation of each student, and the system filters out students in a negative state in real time and notifies relevant personnel.

Based on the student performance evaluation method based on AI identification data according to the above content, the potential exploration module explores students having poor performance but excellent grades.

The above solution has the following beneficial effects: the method uses a unified and generalized data processing algorithm to collect and process identification contents with different functions in multi time-space dimensions, and perform comprehensive performance evaluation of students in any time and space span through these processed data. At the same time, a simulated data generation method with multiple random algorithms is provided to provide a large amount of pre-training data for the deep learning network model.

The above technical solution has the following beneficial effects: the system can perform comprehensive performance evaluation of any subject of the students in any time span in real time, and the real-time evaluation can allow the students themselves and teachers and parents to know the comprehensive learning status of the students in time, and make adjustments according to the evaluation contents. The system can detect students who are in a negative state in time, and remind relevant personnel to help them adjust their learning state. The system can also explore gifted students having poor performance in class but excellent grades.

DETAILED DESCRIPTION OF THE EMBODIMENTS

To make the objectives, technical solutions, and advantages of the present disclosure clearer, the present disclosure will be further described in detail below with reference to specific implementations and the accompanying drawings.

Figure 1:
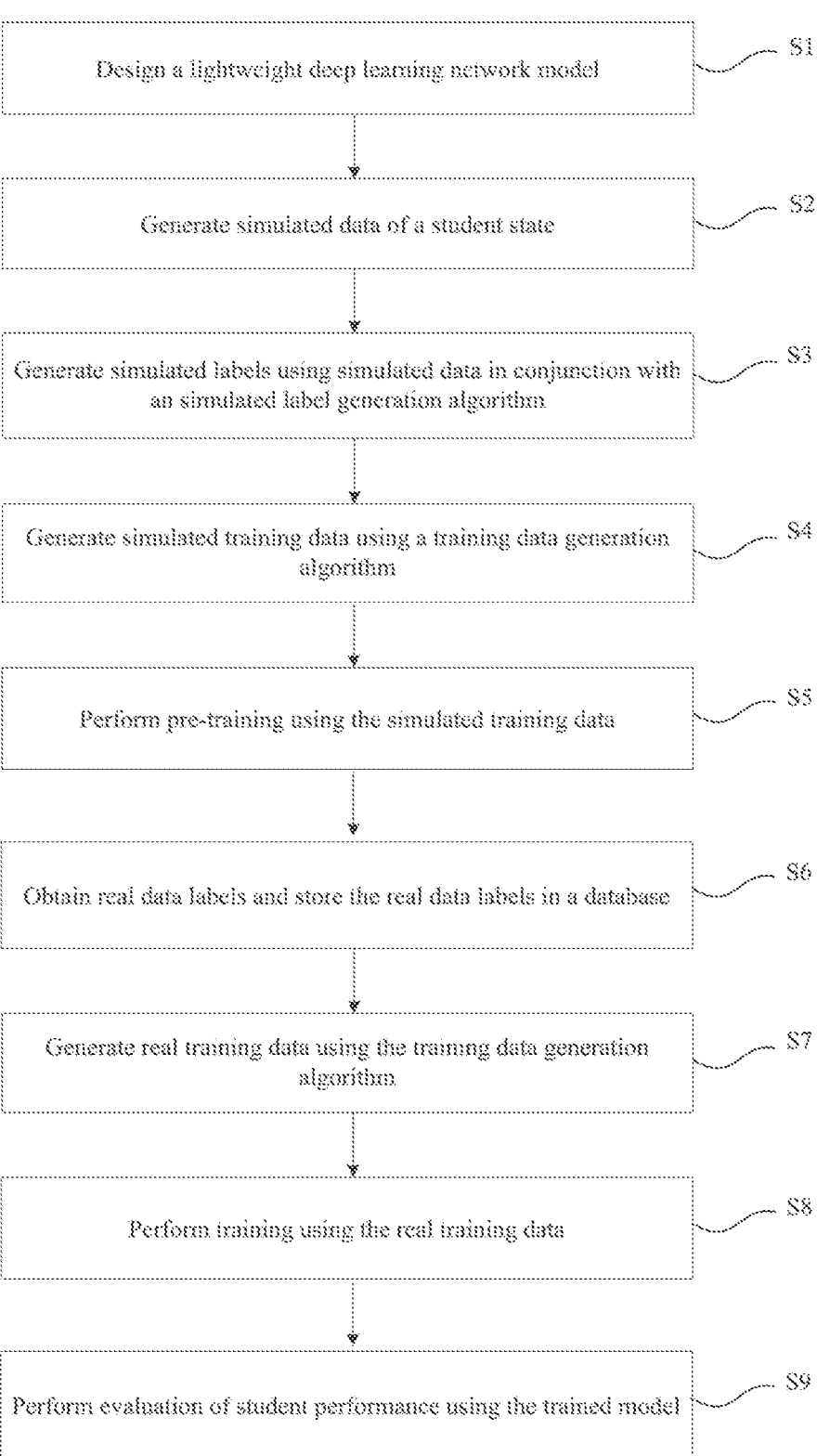
FIG. 1 is a schematic flowchart of a student performance evaluation method based on AI identification data in a specific implementation of the present disclosure.

The present disclosure provides a student performance evaluation method based on AI identification data. In a preferred implementation, a schematic flowchart of the method is shown in FIG. 1, and specifically includes the following steps.

Step S1, a lightweight deep learning network model is designed. The deep learning network model is capable of performing comprehensive performance evaluation of students in any time span by using processed AI identification data.

In this preferred implementation, the model is designed in a server, and the model will automatically complete processes of pre-training, training, prediction, etc.

Step S2, a large number of simulated students and simulated AI identification data corresponding to the simulated students are generated using a MRND simulated data generation algorithm provided herein.

The simulated AI identification data generated in this step meets multidimensional randomness and multiple dimensions meet normal distribution, and a trend of an overall data value is controllable.

Specifically, in this preferred implementation, the simulated AI data meets randomness of course selection of the students, randomness of quality of the students, and randomness of state performance of the students, and meets normal distribution characteristics of overall quality of the students and normal distribution characteristics of state performance of the students.

The purpose of generating the simulated AI identification data is to pre-train the deep learning network model in step S1 using the simulated data, so as to solve the problem of limited sources of real training data.

Step S3, simulated labels are generated by any amount of simulated AI identification data generated in step S2 using an L-E simulated label generation algorithm provided herein.

The simulated labels are used to generate simulated training data, and the simulated training data is used for pre-training of the deep learning network model.

In this preferred implementation, the simulated labels will be stored in a database together with student IDs, course IDs, and time periods corresponding to the simulated labels. In the subsequent generation of the simulated training data, a limited search will be performed on a database of the AI simulated data according to the student IDs, course IDs, and time periods of the simulated labels to obtain the simulated AI identification data. The obtained simulated AI identification data will be used for the generation of simulated data.

Step S4, the AI identification data is processed through an expand and compress (EAC) training data generation algorithm using the simulated labels in step S3 in conjunction with all the simulated AI identification data corresponding to the labels to generate the simulated training data. The simulated training data is permanently stored in the database.

Step S5, the deep learning network model designed in step S1 is pre-trained using the simulated training data generated in step S4.

Step S6, real labels are obtained by means of final grades of the students, regular tests, and active performance evaluation of the teacher. The real labels can be added to the database on a specific web page, and the real labels in the database can also be deleted on the web page.

In this preferred implementation, when the real labels are added to the database, a generation program of the real training data will be directly triggered, and when the real labels are deleted, a deletion program to delete the corresponding training data will be triggered. In addition, the system provides a correction function to ensure one-to-one correspondence between the real labels and the real data.

Step S7, all real labels in the database are obtained, and then all AI identification data corresponding to each real label is obtained in the database.

The obtained AI identification data is processed through the EAC training data generation algorithm to generate final real training data. The real training data is permanently stored in the database.

Step S8, the real training data of the database is obtained, and the deep learning network model in step S1 is trained using the obtained real training data. Different real training data is used for the deep learning network model at different stages.

When prediction accuracy of the deep learning network model is less than or equal to 70%, the training data generated by an N-EAC normal training data generation algorithm is used.

When the prediction accuracy of the deep learning network model is more than 70%, training data generated by a DP-EAC training data generation algorithm with a discard policy is used.

Step S9, after the training of the deep learning network model is mature, comprehensive performance evaluation of the students is performed in any time span using the trained deep learning network model. For example, what is the overall state of a student from the first week to the tenth week, what is the overall state of the student in each course, in which time period is the state performance of the student better, and in which time period is the state performance of the student poor are evaluated.

Figure 2:
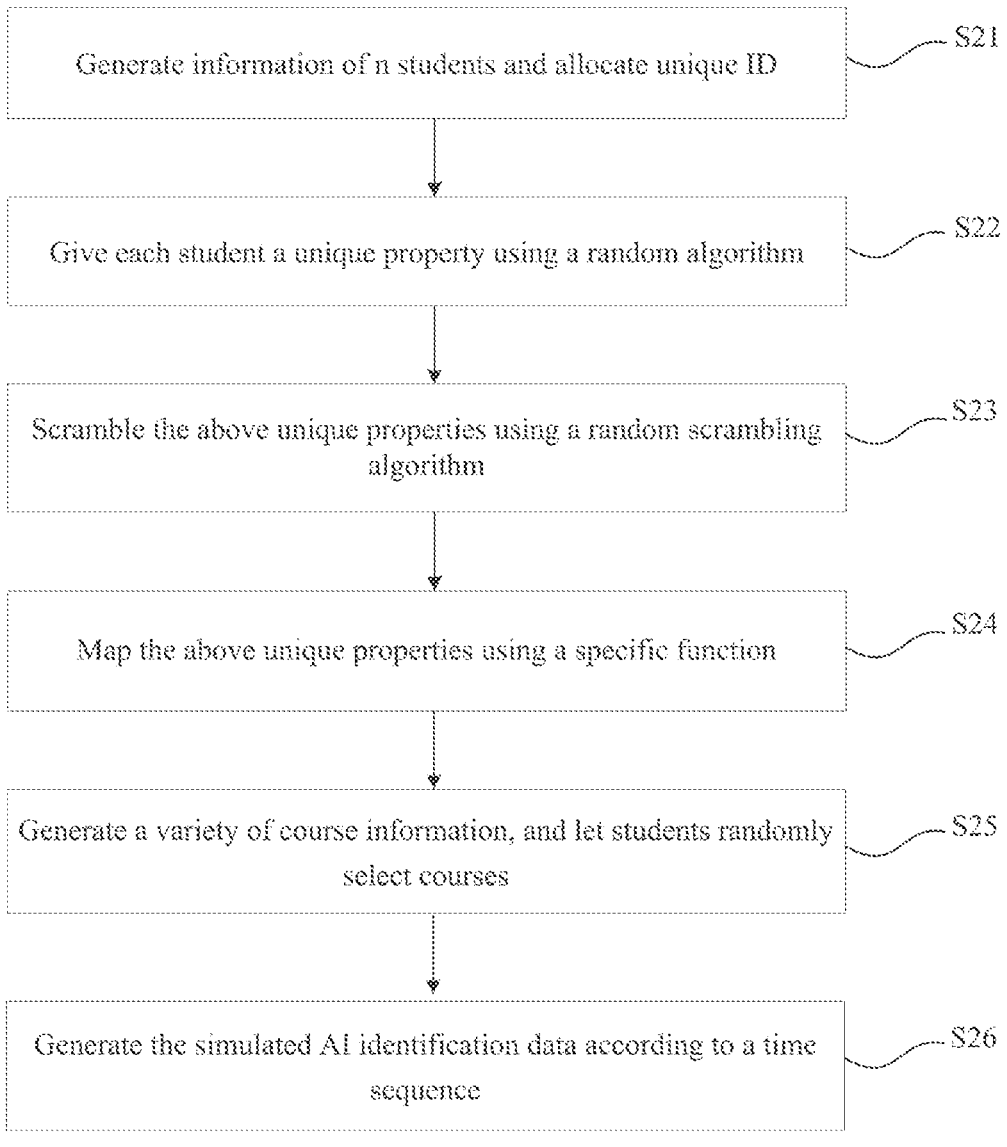
FIG. 2 is a schematic diagram of steps of a multidimensional random normal distribution (MRND) simulated data generation algorithm in a specific implementation of the present disclosure.

In a preferred implementation of the present disclosure, as shown in FIG. 2, a process of generating simulated AI identification data for each student using the MRND simulated data generation algorithm provided herein in step S2 includes the following specific steps.

Step S21, n students are randomly generated, marked with different student Ids. The student IDs are recorded as: $[sid_1, sid_2, \ldots, sid_i, \ldots, sid_n]$.

$sid_i$ is a student ID of an i-th student generated by simulation. In this preferred implementation, the student information further includes gender, college, name, and student IDs, and these basic student information is permanently stored in the database. These generated students simulate a process of selecting courses, attending classes and generating the AI identification data.

Step S22, the student IDs and a P-D random generation algorithm provided herein in step S21 are used to give each student a unique property. A set of unique properties of the n students is recorded as $[property_1, property_2, \ldots, property_i, \ldots, property_n]$. $property_i$ is a unique property of the i-th student generated by simulation. The unique property of each student represents uniqueness of the student generated by simulation, indicating that the student is more inclined to show a good learning state or a bad learning state. The unique property of each student is approximately random, and all unique properties obey normal distribution as a whole. The set of unique properties obtained at the current stage does not have complete randomness and does not obey normal distribution for the time being.

Step S23, the set of unique properties in step S22 is scrambled using a B-U random scrambling algorithm to obtain a scrambled set of unique properties $[Lproperty_2, Lproperty_2, \ldots, Lproperty_i, \ldots, Lproperty_n]$. The scrambled unique properties are almost completely random.

Step S24, values in the scrambled set of unique properties are mapped by a function, such that the scrambled set of unique properties after mapping has a normal distribution characteristic. Each $Lproperty_i$ in the scrambled set of unique properties is mapped by the function:

$$f(x) = \begin{cases} 0.5 - 0.5 \dfrac{G(x - 0.5)}{G(0.5) - G(0)}, & x \le 0.5 \\ 0.5 + 0.5 \dfrac{G(x - 0.5)}{G(0.5) - G(0)}, & x > 0.5 \end{cases} \quad .G(x) = \frac{1}{2} e^{\frac{-\pi(x-0.5)^2}{4}} .$$

The scrambled set of unique properties after mapping is recorded as a final set of unique properties:

$$[finalProperty_1, finalProperty_2, \ldots, finalProperty_i, \ldots, finalProperty_n].$$

In this preferred implementation, these unique properties will also be stored in the database in one-to-one correspondence with the corresponding student IDs.

Step S25, Le courses are defined. Each course has choice$_i$ (Le$\geq$i$>$0) choices, and each course has teacher, class time, and course week information. Each student generated in step S21 randomly selects courses based on these courses.

Step S26, the simulated AI identification data are sequentially generated from the first course of the first week according to a time sequence.

Specifically, all students who have taken the course are obtained, and the simulated AI identification data is generated for each student using the Final simulated data generation algorithm provided herein.

In this implementation, all subdivision steps of step S2 are written in the program, which can ensure that the simulated data can be automatically and intelligently generated in the server.

In a preferred implementation of the present disclosure, in step S22, a process of using the random generation algorithm to give each student the unique property includes the following specific steps.

Step S221, a prime number K greater than n is customized, and each student ID in a student ID set in step S21 is divided by K to obtain a set of temper numbers:

$$[sid_1/K, sid_2/K, \ldots, sid_i/K, \ldots sid_n/K] = [temperNumber_1, temperNumber_2, \ldots, temperNumber_i, \ldots, temperNumber_n].$$

temperNumber$_i$ is a temper number of the i-th student generated by simulation.

Step S222, a truncation start bit K and a truncation stop bit J are customized, and J$>$K. K-th to J-th bits after a decimal point of each temper number in the set of temper numbers in step S221 are intercepted to obtain a set of truncation numbers [truncation$_1$, truncation$_2$, \ldots, truncation$_i$, \ldots, truncation$_n$].

Step S223, each number in the set of truncation numbers in step S222 is divided by $10^{J+1-k}$ to obtain the unique property:

$$[truncation_1/10^{J+1-K}, truncation_2/10^{J+1-K}, \ldots, truncation_i/10^{J+1-K}, \ldots, truncation_n/10^{J+1-K}] = [property_1, property_2, \ldots, property_i, \ldots, property_n].$$

In a preferred implementation of the present disclosure, in step S23, a process of scrambling the set of unique properties in step S22 using the random scrambling algorithm includes the following specific steps.

Step S231, a number of scrambling Y, a random seed X1, a random seed X2, a modulus M1, a modulus M2, a multiplication amount A1, a multiplication amount A2, and a loop mark I=1 are customized.

Step S232, n$\times$(X1/M1) is rounded down to obtain P$_I$, and n$\times$(X2/M2) is rounded down to obtain Q$_I$. X1=(A1$\times$X1+C1), and X2=(A2$\times$X2+C2). The remainder of X1 is taken using M1 and a remainder result is assigned to X1, and the remainder of X2 is taken using M2 and a remainder result is assigned to X2. I=I+1.

Step S233, when I is less than Y, S232 is executed until I is greater than or equal to Y. Finally, a set of scrambling instructions [P$_1$, Q$_1$, P$_2$, Q$_2$, \ldots, P$_i$, Q$_i$, \ldots, P$_Y$, Q$_Y$] is obtained.

Step S234, P$_i$, Q$_i$ (1$<<$i$\leq$Y) is taken out from the beginning to the end in pairs each time from the set of scrambling instructions in step S233, and then two properties with subscripts of P$_i$, Q$_i$ in the set of unique properties in step S22 are exchanged. [Lproperty$_1$, Lproperty$_2$, \ldots, Lproperty$_i$, \ldots, Lproperty$_n$] is obtained after all exchanges are completed.

In a preferred implementation of the present disclosure, in step S26, a process of generating the simulated AI identification data using the Final simulated data generation algorithm provided herein includes the following steps.

Step S261, a number B obeying (0,1) normal distribution is randomly generated.

Step S262, the unique property of the student finalProperty$_i$ corresponding to the simulated AI identification data being generated is obtained.

If B+finalProperty$_i$, step S263 is executed between an interval [0,1], otherwise step S261 is executed.

Step S263, an overall positive state rate of the currently generated simulated AI identification data is customized as V. A positive state is output if B+finalProperty$_i$ is greater than a in the following equation, and a negative state is output if B+finalProperty$_i$ is less than or equal to a in the following equation.

The equation in step S263 is $$\frac{\int_0^1 \int_0^a \frac{1}{\sqrt{2\pi}} e^{-\frac{(x-y)^2}{2}} \, dx \, dy}{\int_0^1 \int_0^1 \frac{1}{\sqrt{2\pi}} e^{-\frac{(x-y)^2}{2}} \, dx \, dy} = V.$$

Since a value on a left side of the above equation increases with a, only B+finalProperty$_i$ is replaced with a in the equation during specific determination, and whether the value on the left side of the equation is greater than or less than V is determined after replacement, the positive state is output if the value on the left side of the equation is greater than V, and the negative state is output if the value on the left side of the equation is less than V.

Figure 3:
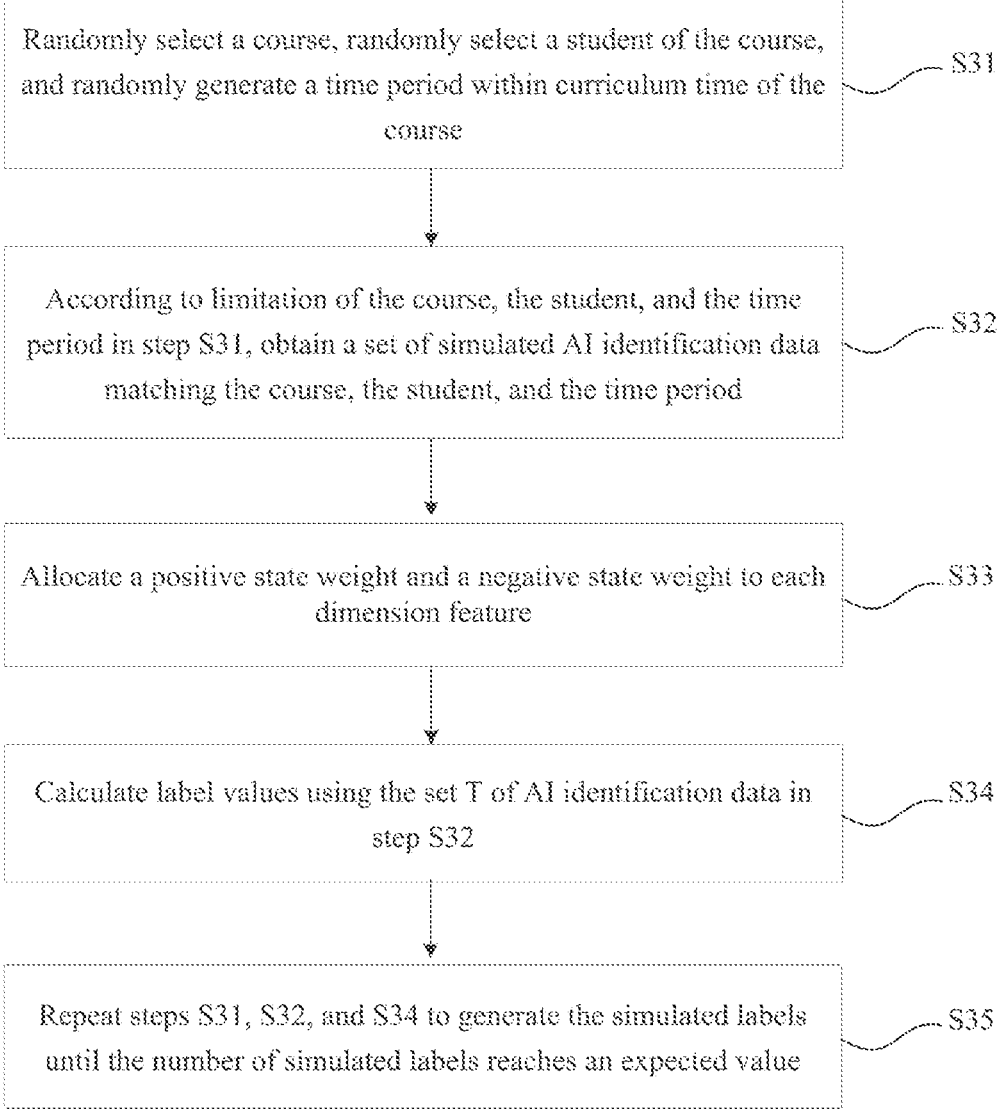
FIG. 3 is a schematic diagram of steps of an logic export (L-E) simulated label generation algorithm in a specific implementation of the present disclosure.

In a preferred implementation of the present disclosure, as shown in FIG. 3, in step S3, a process of generating simulated labels by any amount of simulated AI identification data generated in step S2 using the L-E simulated label generation algorithm provided herein includes the following steps.

Step S31, a course is randomly selected, a student of the course is randomly selected, and a time period is randomly generated. This time period is within a time period corresponding to the selected course.

Step S32, according to limitation of the course, the student, and the time period in step S31, a set of simulated AI identification data matching the course, the student, and the time period is obtained:

$$T = \{[a_{11}, a_{12}, \ldots, a_{1i}, \ldots, a_{1n}], [a_{21}, a_{22}, \ldots, a_{2i}, \ldots, a_{2n}], \ldots, [a_{m1}, a_{m2}, \ldots, a_{mi}, \ldots, a_{mn}]\}.$$

Step S33, a positive state weight and a negative state weight are allocated to each dimension feature. Each dimension feature defines a weight allocation function $g_i(x)$, and each weight allocation function further has a weight W$_i$.

Step S34, label values are calculated using the set T of AI identification data in step S32:

$$\text{label} = \frac{\sum_{i=1}^{m} \sum_{j=1}^{n} T[i][j]g_j(x)W_j}{m \times \left( \sum_{i=1}^{n} W_i \right)} \times 100.$$

Step S35, steps S31, S32, and S34 are repeated to generate the simulated labels until the number of simulated labels reaches an expected value.

In a preferred implementation of the present disclosure, in step S4, the EAC training data generation algorithm provided herein includes the following steps.

Step S41, all the AI identification data corresponding to the labels in step S4 is obtained:

$$\text{Data} = \{[a_{11}, a_{12}, \dots, a_{1i}, \dots, a_{1n}], [a_{21}, a_{22}, \dots, a_{2i}, \dots, a_{2n}], \dots, [a_{i1}, a_{i2}, \dots, a_{ii}, \dots, a_{in}], \dots, [a_{m1}, a_{m2}, \dots, a_{mi}, \dots, a_{mn}]\}.$$

Step S42, since a standard training data length is determined to be S, step S43 is executed when m in Data is less than S, step S44 is executed when m in Data is greater than S, and if S is equal to m, the data Data is directly matched with the label as one of the final training data.

Step S43, A=S/m, A is rounded down to obtain A1, and the remainder of S to m is taken to obtain B.

A1−1 copies of B elements in Data are copied, A1+1 copies of m-B elements are copied. The copied Data is matched with the label as one of the final training data.

Step S44, C=m/S, C is rounded down to obtain B1, and the remainder of m to S is taken to obtain D.

The first D connected elements with a length of B1−1 in Data are summed and averaged to synthesize an element, and m-B connected elements with a length of B are summed and averaged to synthesize an element. Data after synthesis is matched with the label as one of the final training data.

The present disclosure further provides a student performance evaluation system based on AI identification data. In a preferred implementation, the system includes but is not limited to a comprehensive evaluation module, an early warning module, and a potential exploration module.

In this preferred implementation, the comprehensive evaluation module is visually displayed on a web page, and relevant personnel with authority can view the overall state of any student in any time period and any course in real time, the comprehensive state of the student in all courses and all time periods, the overall state of all students under a course, and the state of all students under all courses.

In this preferred implementation, based on the student performance evaluation method based on AI identification data, the early warning module performs negative performance evaluation of each student, and the system updates students in a negative state in real time and notifies relevant personnel. Specifically, the relevant personnel can obtain the basic information of the negative students at the first time, and then further understand these negative students in more detail in the comprehensive evaluation module through these basic information, and can guide the students in a negative learning state in time if necessary.

In this preferred implementation, based on the student performance evaluation method based on AI identification data, the potential exploration module explores students having poor performance but excellent grades.

What is claimed is:

1. A method for comprehensive performance evaluation of students based on a deep learning network model, which is implemented in a system comprising a processor a memory, wherein the memory stores instructions for the processor to perform the following steps:

step S1, designing the deep learning network model, wherein the deep learning network model is stored in the memory and capable of performing comprehensive performance evaluation of in any time span;

step S2, generating simulated artificial intelligence (AI) identification data containing the students using a simulated data generation algorithm;

step S3, generating simulated labels by any amount of simulated AI identification data generated in step S2 using a simulated label generation algorithm, wherein the simulated labels are used to generate simulated training data, and the simulated training data is used for pre-training of the deep learning network model;

step S4, processing the simulated AI identification data through a training data generation algorithm using the simulated labels in step S3 in conjunction with all the simulated AI identification data corresponding to the labels to generate the simulated training data, wherein the simulated training data is stored in a database in the memory;

step S5, pre-training the deep learning network model designed in step S1 using the simulated training data generated in step S4;

step S6, determining real labels of the students, wherein the real labels represent performance evaluation of the students, and the real labels are stored in the database in the memory, and are capable of being modified;

step S7, obtaining all real labels in the database, and then obtaining all real AI identification data corresponding to each real label in the database; and processing the obtained real AI identification data through the training data generation algorithm to generate final real training data, wherein the final real training data is stored in the database;

step S8, obtaining the real training data of the database, and training the deep learning network model in step S1 using the obtained real training data, wherein different real training data is used for the deep learning network model at different stages;

when prediction accuracy of the deep learning network model is less than or equal to 70%, the training data generated by the training data generation algorithm is used; and when the prediction accuracy of the deep learning network model is more than 70%, training data generated by a training data generation algorithm with a discard policy is used; and step S9, performing comprehensive performance evaluation of the students in any time and space span using the trained deep learning network model;

wherein the simulated label generation algorithm in step S3 comprises the following specific steps:

step S3.1, randomly selecting a course, randomly selecting a student which selects the course, and randomly generating a time period, wherein this time period is within a time period corresponding to the selected course;

step S3.2, according to limitation of the course, the student, and the time period in step S3.1, obtaining, a set of simulated AI identification data matching the course, the student, and the time period:

$$T = \{[a_{11}, a_{12}, \dots, a_{1i}, \dots, a_{1n}], [a_{21}, a_{22}, \dots, a_{2i}, \dots, a_{2n}], \dots, [a_{m1}, a_{m2}, \dots, a_{mi}, \dots, a_{mn}]\}, \text{ wherein}$$

$a_{mi}$ represents an i-th simulated AI identification data in a randomly generated m-th time period under the premise of the limitation of the course and the student, step S3.3, allocating a positive state weight and a negative state weight to each dimension feature, wherein each dimension feature defines a weight allocation function $g_i(x)$, and each weight allocation function further has a weight $W_j$;

step S3.4, calculating label values using the set T of simulated AI identification data in step S3.2:

$$label = \frac{\sum_{i=1}^{m} \sum_{j=1}^{n} T[i][j] g_j(x) W_j}{m \times \left( \sum_{i=1}^{n} W_i \right)} \times 100; \text{ and}$$

step S3.5, repeating steps S3.1, S3.2, and S3.4 to generate the simulated labels until a number of simulated labels reaches an expected value.

2. The method for comprehensive performance evaluation of students based on the deep learning network model according to claim 1, wherein the simulated data generation algorithm in step S2 comprises the following specific steps:

step S2.1, randomly generating information of n students, marking the student information with different student identities (IDs), wherein the student IDs are recorded as:

$[sid_1, sid_2, \ldots, sid_i, \ldots, sid_n]$; and $sid_i$ is a student ID of an i-th student generated by simulation, the student information further comprises gender, college, and name, these basic student information is permanently stored in the database, and these generated students simulate a process of selecting courses, attending classes and generating the AI identification data;

step S2.2, using the student IDs and a random generation algorithm in step S2.1 to give each student a unique property, wherein a set of unique properties of the n students is recorded as [$property_1$, $property_2$, . . . , $property_i$, . . . , $property_n$], and $property_i$ is a unique property of the i-th student generated by simulation; the unique property of each student represents uniqueness of the simulated student, indicating a learning state of the simulated student, all unique properties obey normal distribution as a whole, and the set of unique properties obtained at the current stage does not have complete randomness and does not obey normal distribution for the time being;

step S2.3, scrambling the set of unique properties in step S2.2 using a random scrambling algorithm to obtain a scrambled set of unique properties [$Lproperty_1$, $Lproperty_2$, . . . , $Lproperty_i$, . . . , $Lproperty_n$], wherein the scrambled unique properties are random;

step S2.4, mapping values in the scrambled set of unique properties by a function, such that the scrambled set of unique properties after mapping has a normal distribution characteristic, wherein each $Lproperty_i$ in the scrambled set of unique properties is mapped by the function:

$$f(Lproperty_i) = \begin{cases} 0.5 - 0.5\frac{G(Lproperty_i - 0.5)}{G(0.5) - G(0)}, & Lproperty_i \le 0.5 \\ 0.5 + 0.5\frac{G(Lproperty_i - 0.5)}{G(0.5) - G(0)}, & Lproperty_i > 0.5 \end{cases}, \text{ and}$$

-continued $$G(x) = \frac{1}{2} e^{\frac{-\pi(Lproperty_i - 0.5)^2}{4}},$$

and the scrambled set of unique properties after mapping is recorded as a final set of unique properties:

[$finalProperty_1$, $finalProperty_2$, . . . , $finalProperty_i$, . . . , $finalProperty_n$];

step S2.5, defining Le courses, wherein each course has choice; choices, Le≥i>0, and each course has teacher, class time, and course week information; and each student generated in step S2.1 randomly selects courses based on these courses; and step S2.6, sequentially generating the simulated AI identification data from a first course of a first week according to a time sequence, wherein in step S2.3 scrambling the set of unique properties in step S2.2 using the random scrambling algorithm comprises the following steps:

step S2.3.1, setting a number of scrambling Y, a random seed X1, a random seed X2, a modulus M1, a modulus M2, a multiplication amount A1, a multiplication amount A2, and a loop mark I=1;

step S2.3.2, rounding down n×(X1/M1) to obtain $P_1$, and rounding down n×(X2/M2) to obtain $Q_1$, wherein X1= (A1×X1+CD), and X2=(A2×X2+C2); and taking the remainder of X1 using M1 and assigning a remainder result to X1, and taking the remainder of X2 using M2 and assigning a remainder result to X2, wherein I=I+1;

step S2.3.3, when I is less than Y, executing S2.3.2 until I is greater than or equal to Y to finally obtain a set of scrambling instructions [$P_1$, $Q_1$, $P_2$, $Q_2$, . . . , $P_i$, $Q_i$, . . . , $P_Y$, $Q_Y$]; and step S2.3.4, taking out $P_i$, $Q_i$, 1<<I≤Y from the beginning to the end in pairs each time from the set of scrambling instructions in step S2.3.3, and then exchanging two properties with subscripts of $P_i$, $Q_i$ in the set of unique . . . properties in step S2.2 to obtain [$Lproperty_1$, $Lproperty_2$, . . . $Lproperty_i$, . . . $Lproperty_n$] after all exchanges are completed.

3. The method for comprehensive performance evaluation of students based on the deep learning network model according to claim 1, wherein the training data generation algorithm in steps S4, S7, and S8 comprises the following specific steps:

step S4.1, obtaining all the AI identification data corresponding to the labels in step S4:

Data=[$a_{11}, a_{12}, \ldots, a_{1i}, \ldots, a_{1n}$], [$a_{21}, a_{22}, \ldots, a_{2i}, \ldots, a_{2n}$], . . . , [$a_{m1}, a_{m2}, \ldots, a_{mi}, \ldots, a_{mn}$]};

step S4.2, determining a standard training data length to be S;

when m in Data is equal to S, directly matching the data Data with the label as one of the final training data;

when m in Data is less than S, calculating A=S/m, rounding down A to obtain A1, and taking a remainder of S to m to obtain B;

copying A1−1 copies of random B elements in Data, copying A1+1 copies of remaining m−B elements, and matching the copied Data with the label as one of the final training data; and when m in Data is greater than S, calculating C=m/S, rounding down C to obtain B1, and taking the remainder of m to S to obtain D, summing and averaging the first D connected elements with a length of B1−1 in Data to synthesize an element, summing and averaging m-B connected elements with a length of B in the remaining elements to synthesize an element, and matching Data after synthesis with the label as one of the final training data.

4. The method for comprehensive performance evaluation of students based on the deep learning network model according to claim 2, wherein in step S2.2, a process of using the random generation algorithm to give each student the unique property comprises the following specific steps:

step S2.2.1, setting a prime number K greater than n, and dividing each student ID in a student ID set in step S2.1 by K to obtain a set of temper numbers:

$[sid_1/K, sid_2/K, \ldots, sid_i/K, \ldots sid_n/K]=[temperNumber_1,$ $temperNumber_2, \ldots, temperNumber_i, \ldots, temper$-$Number_n]$, wherein $temperNumber_i$ is a temper number of the i-th student generated by simulation;

step S2.2.2, setting a truncation start bit K and a truncation stop bit J, wherein J>K; and intercepting K-th to J-th bits after a decimal point of each temper number in the set of temper in numbers step S2.2.1 obtain a set of truncation numbers to $[truncation_1, truncation_2, \ldots,$ $truncation_i, \ldots, truncation_n]$; and step S2.2.3, dividing each number in the set of truncation numbers in step S2.2.2 by $10^{J+1-k}$ to obtain the unique property:

$[truncation_1/10^{J+1-K}, truncation_2/10^{J+1-K}, \ldots, trunca$-$tion_i/10^{J+1-K}, \ldots, truncation_n/10^{J+1-K}]=[prop$-$erty_1, property_2, \ldots, property_i, \ldots, property_n].$ 5. The method for comprehensive performance evaluation of students based on the deep learning network model according to claim 2, wherein step S2.6 comprises the following specific steps:

step S2.6.1, randomly generating a number B obeying (0,1) normal distribution;

step S2.6.2, obtaining the unique property of the student $finalProperty_i$ corresponding to the simulated AI identification data being generated; and if $B+finalProperty_i$, executing step S2.6.3 between an interval [0,1], otherwise executing step S2.6.1; and step S2.6.3, customizing an overall positive state rate of the currently generated simulated AI identification data as V, outputting a positive state if $B+finalProperty_i$ is greater than a in the following equation, and outputting a negative state if $B+finalProperty_i$ is less than or equal to a in the following equation, wherein the equation in step S2.6.3 is $$\frac{\int_0^1 \int_0^a \frac{1}{\sqrt{2\pi}} e^{-\frac{(x-y)^2}{2}} dxdy}{\int_0^1 \int_0^1 \frac{1}{\sqrt{2\pi}} e^{-\frac{(x-y)^2}{2}} dxdy} = V,$$

and since a value on a left side of the above equation increases with a, only $B+finalProperty_i$ is replaced with a in the equation during specific determination, and whether the value on the left side of the equation is greater than or less than V is determined after replacement, the positive state is output if the value on the left side of the equation is greater than V, and the negative state is output if the value on the left side of the equation is less than V.

\* \* \* \* \*